(12) United States Patent
Reusch

(10) Patent No.: US 10,647,405 B2
(45) Date of Patent: May 12, 2020

(54) KICKED SPARS FOR RUDDER AND ELEVATOR APPLICATIONS

(71) Applicant: The Boeing Company, Chicago, IL (US)

(72) Inventor: David C. Reusch, Normandy Park, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/440,470

(22) Filed: Jun. 13, 2019

(65) Prior Publication Data
US 2019/0322348 A1 Oct. 24, 2019

Related U.S. Application Data

(62) Division of application No. 15/500,864, filed as application No. PCT/US2014/058134 on Sep. 29, 2014, now Pat. No. 10,364,015.

(51) Int. Cl.
*B64C 3/18* (2006.01)
*B64C 5/02* (2006.01)
*B64C 9/02* (2006.01)
*B64C 3/14* (2006.01)
*B64C 3/00* (2006.01)
*B64C 13/00* (2006.01)

(52) U.S. Cl.
CPC ............... *B64C 3/18* (2013.01); *B64C 3/14* (2013.01); *B64C 3/185* (2013.01); *B64C 5/02* (2013.01); *B64C 9/02* (2013.01); *B64C 3/00* (2013.01); *B64C 13/00* (2013.01); *B64C 2003/142* (2013.01)

(58) Field of Classification Search
CPC ...................................................... B64C 3/185
See application file for complete search history.

(56) References Cited

U.S. PATENT DOCUMENTS

| | | |
|---|---|---|
| 2,861,758 A | 11/1958 | Howard |
| 2,927,469 A | 3/1960 | Czerwinski |
| 3,109,614 A | 11/1963 | Steidl |

(Continued)

FOREIGN PATENT DOCUMENTS

| | | |
|---|---|---|
| CN | 103832576 | 6/2014 |
| CN | 105366035 | 3/2016 |

(Continued)

OTHER PUBLICATIONS

International Searching Authority, "Written Opinion," issued in connection with PCT Application No. PCT/US14/58134, dated Jul. 7, 2015, 4 pages.

(Continued)

*Primary Examiner* — Philip J Bonzell
*Assistant Examiner* — Michael B. Kreiner
(74) *Attorney, Agent, or Firm* — Hanley, Flight & Zimmerman, LLC

(57) ABSTRACT

An aerodynamic structure incorporated in an aircraft control surface provides a spar extending along at least a portion of the control surface in a direction and the spar includes a plurality of bends along the direction of extension along the control surface to provide space to accommodate actuator fittings or other structural or operational requirements.

20 Claims, 12 Drawing Sheets

(56) References Cited

U.S. PATENT DOCUMENTS

| | | | |
|---|---|---|---|
| 4,479,620 A | 10/1984 | Rogers et al. | |
| 5,098,043 A | 3/1992 | Arena | |
| 8,720,822 B2 * | 5/2014 | Vaneck | B64C 3/185 244/123.1 |
| 8,864,075 B2 * | 10/2014 | Gray | B29C 70/30 244/123.1 |
| 8,973,871 B2 * | 3/2015 | Marcoe | B64C 3/185 244/123.7 |
| 2001/0017336 A1 | 8/2001 | Hirahara et al. | |
| 2001/0024603 A1 | 9/2001 | Stone et al. | |
| 2002/0100840 A1 | 8/2002 | Billinger et al. | |
| 2006/0226291 A1 | 10/2006 | Law | |
| 2009/0289147 A1 | 11/2009 | Lavaud et al. | |
| 2014/0001309 A1 | 1/2014 | Tieys et al. | |
| 2015/0203187 A1 * | 7/2015 | Johnson | B64C 3/185 244/123.7 |
| 2017/0217563 A1 | 8/2017 | Reusch | |
| 2017/0334541 A1 * | 11/2017 | Williams | B29C 70/30 |

FOREIGN PATENT DOCUMENTS

| | | | |
|---|---|---|---|
| EP | 1915291 | 4/2008 | |
| EP | 2955107 | 12/2015 | |
| GB | 129687 | 7/1919 | |
| JP | H05286496 | 11/1993 | |
| JP | 2000043796 | 2/2000 | |
| JP | 2000506815 | 6/2000 | |
| JP | 2014125064 | 7/2014 | |
| WO | 199734733 | 9/1997 | |
| WO | 2013005206 | 1/2013 | |
| WO | 2013078646 | 6/2013 | |
| WO | WO-2013078646 A1 * | 6/2013 | B64C 3/24 |

OTHER PUBLICATIONS

International Searching Authority, "Search Report," issued in connection with PCT Application No. PCT/US14/58134, dated Jul. 7, 2015, 2 pages.

European Patent Office, "Extended European Search Report," issued in connection with European Patent Application No. 14903033.0, dated Jan. 31, 2018, 7 pages.

Japanese Patent Office, "Non-Final Office Action," issued in connection with Japanese Patent Application No. 2017-512924, dated Jul. 13, 2018, 9 pages.

Structural Design of Aircraft (First Edition), Tsuruo Torikai, Shinji Kuse, Japan Airlines Technical Association, Feb. 22, 1992, p. 158-163 and 194.

The State Intellectual Property Office of the People's Republic of China; "First Office Action and Search Report"; dated Nov. 1, 2018 in connection with Chinese Application No. 2014800819139; 13 pages.

United States Patent and Trademark Office, "Non-Final Office Action", issued in connection with U.S. Appl. No. 15/500,864 dated Jun. 29, 2018, 7 pages.

United States Patent and Trademark Office, "Final Office Action", issued in connection with U.S. Appl. No. 15/500,864 dated Nov. 29, 2018, 9 pages.

United States Patent and Trademark Office, "Restriction", issued in connection with U.S. Appl. No. 15/500,864 dated Apr. 12, 2018, 6 pages.

United States Patent and Trademark Office, Notice of Allowance and Fee(s) Due, issued in connection with U.S. Appl. No. 15/500,864 dated Mar. 15, 2019, 5 pages.

The State Intellectual Property Office of the People's Republic of China, "Second Office Action", dated Jul. 2, 2019 in connection with Chinese Application No. 2014800819139, 6 pages.

The State Intellectual Property Office of the People's Republic of China, "Third Office Action", dated Nov. 21, 2019 in connection with Chinese Application No. 2014800819139, 9 pages.

* cited by examiner

KICKED SPARS FOR RUDDER AND ELEVATOR APPLICATIONS

RELATED APPLICATIONS

This patent arises from a divisional of U.S. application Ser. No. 15/500,864, titled "Kicker Spars For Rudder And Elevator Applications," filed Jan. 31, 2017, which is a § 371 national stage entry of PCT/US2014/058134, titled "Kicker Spars For Rudder And Elevator Applications," filed Sep. 29, 2014, both of which are hereby incorporated by this reference in their entireties.

BACKGROUND INFORMATION

Field

Embodiments of the disclosure relate generally to the field of structural systems for aircraft and more particularly to spars having offset webs to accommodate fittings or other structural limitations within low profile chord designs.

Background

Widespread use of composite structural systems with their associated high strength in aircraft has allowed tailoring of very thin cross-sections in aerodynamic surfaces with spars and other structure having reduced depth. However, in many cases, structural fittings, attachment limitations or other requirements are difficult to fit within the thin sections. In actuated surfaces with high loading, excessive moment arms may be required if fittings are placed in a standard structural arrangement within the thin sections. In addition it usually advantageous to locate the spar as close to the hinge line as possible. This creates challenges when attempting to locate fittings and maintain adequate space for joints.

It is therefore desirable to provide a structural design for spars used in such thin structures which allows more room to bolt the highly loaded actuator fittings or otherwise accommodate structural requirements without compromising the actuator fitting joint, compromising the repair capability, moving the spar within the design or otherwise aggravating hinge offsets and hinge loads, or segmenting the spar.

SUMMARY

Exemplary embodiments provide an aerodynamic structure incorporated in an aircraft aerodynamic control surface. A spar extends along the entire or at least a portion of the control surface in a direction and the spar includes a plurality of bends along spanwise direction of the control surface.

The embodiments disclosed provide a method wherein a determination is made of additional space requirements for actuator fittings or other structural or operational requirements. Chordwise offset of a spar kick corresponding to the additional space requirement is established and a profile for the web in the spar with appropriate inflection points, or break points, to accomplish the necessary kick is established.

BRIEF DESCRIPTION OF THE DRAWINGS

The features and advantages of embodiments disclosed herein will be better understood by reference to the following detailed description when considered in connection with the accompanying drawings wherein.

DETAILED DESCRIPTION

For purposes of description herein, span refers to length of the aerodynamic control surface, chord refers to width of the control surface from a leading to a trailing edge and depth refers to the thickness of the control surface at a particular combination of span and chord. In description of placement of elements terms of spanwise or chordwise location may be employed. An exemplary embodiment of an aircraft control surface employs a spar composed of a conventional C-Channel which has a "kick" (bends) at several locations allowing the chordwise offset of the spar web to be optimized or alternatively, allows optimization of the chordwise placement of the spar along the entire span of the spar. The embodiments described herein may be specifically employed in rudder or elevator applications and will be described with respect to a rudder application. The rudder spar incorporates a web that bends in the forward and aft direction, relative to an installed orientation, or installation orientation, on an aircraft, at one or more spanwise locations to provide increased space at the areas of connection to actuators that control the movable rudder control surfaces. This structural arrangement allows the spar to be placed in the optimal position at each hinge or actuator fitting for the entire span of the spar.

Figure 1:
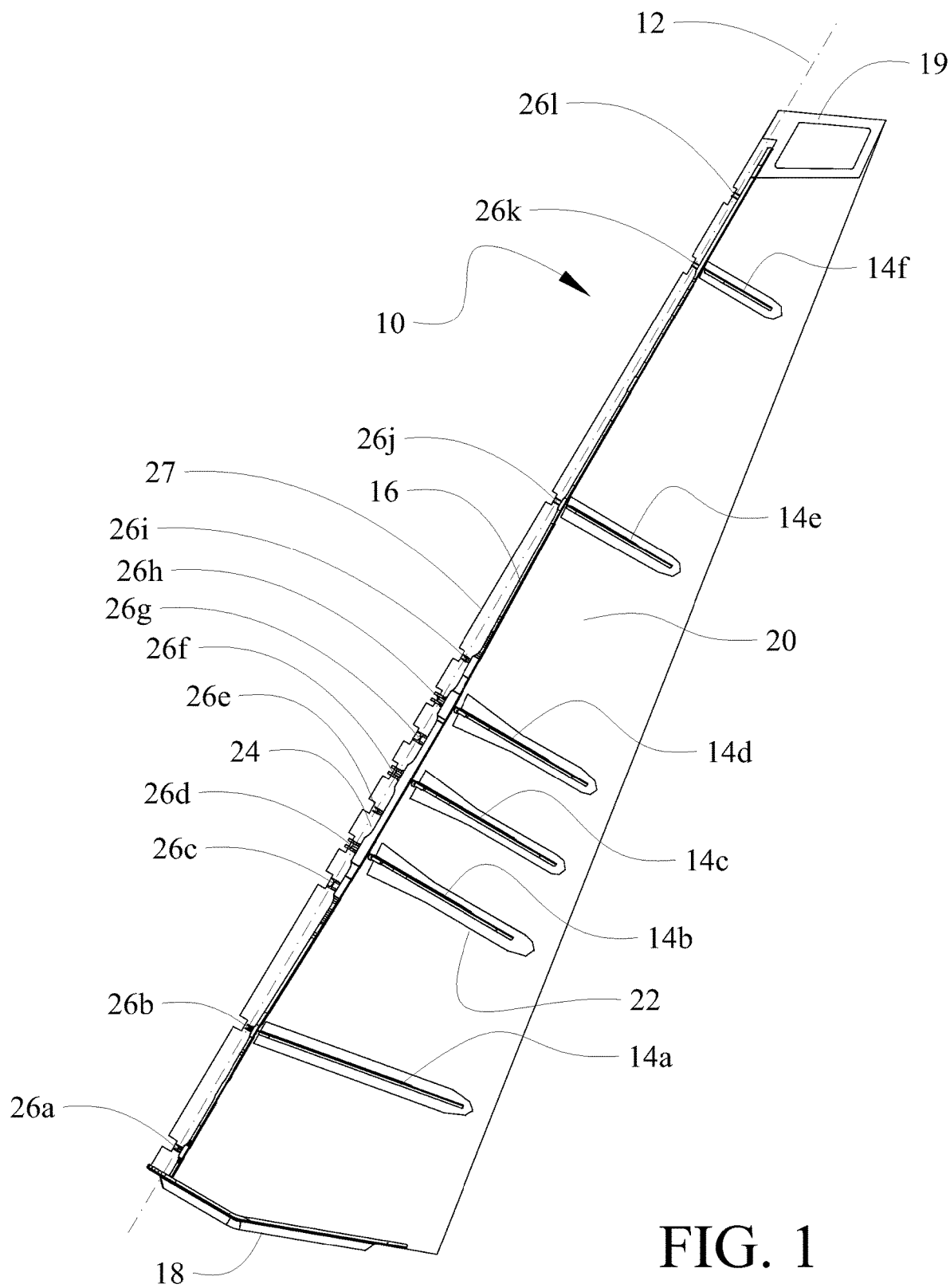
FIG. 1 is a side view of a rudder embodiment with the near side skin removed to expose the internal structure.

Referring to the drawings, FIG. 1 shows a rudder 10 with the near side skin removed to show the underlying structure. The rudder 10 attaches to a vertical stabilizer on the aircraft on a hingeline 12. The structure of the rudder incorporates a plurality of ribs 14a-14f and a spar 16 which extends in a spanwise direction from a lower (inboard with respect to the span of the rudder) end plate 18 to an upper (spanwise outboard) cap structure 19. Skins 20 cover the rudder structure. The skins 20 may incorporate laminated build ups 22, 24 at rib locations and adjacent the spar. Fittings 26a-26l are employed for engaging hinge or actuator elements for operation of the rudder 10, as will be described in greater detail subsequently. Similar structure may be employed in an elevator employing the embodiment described.

Figure 2A:
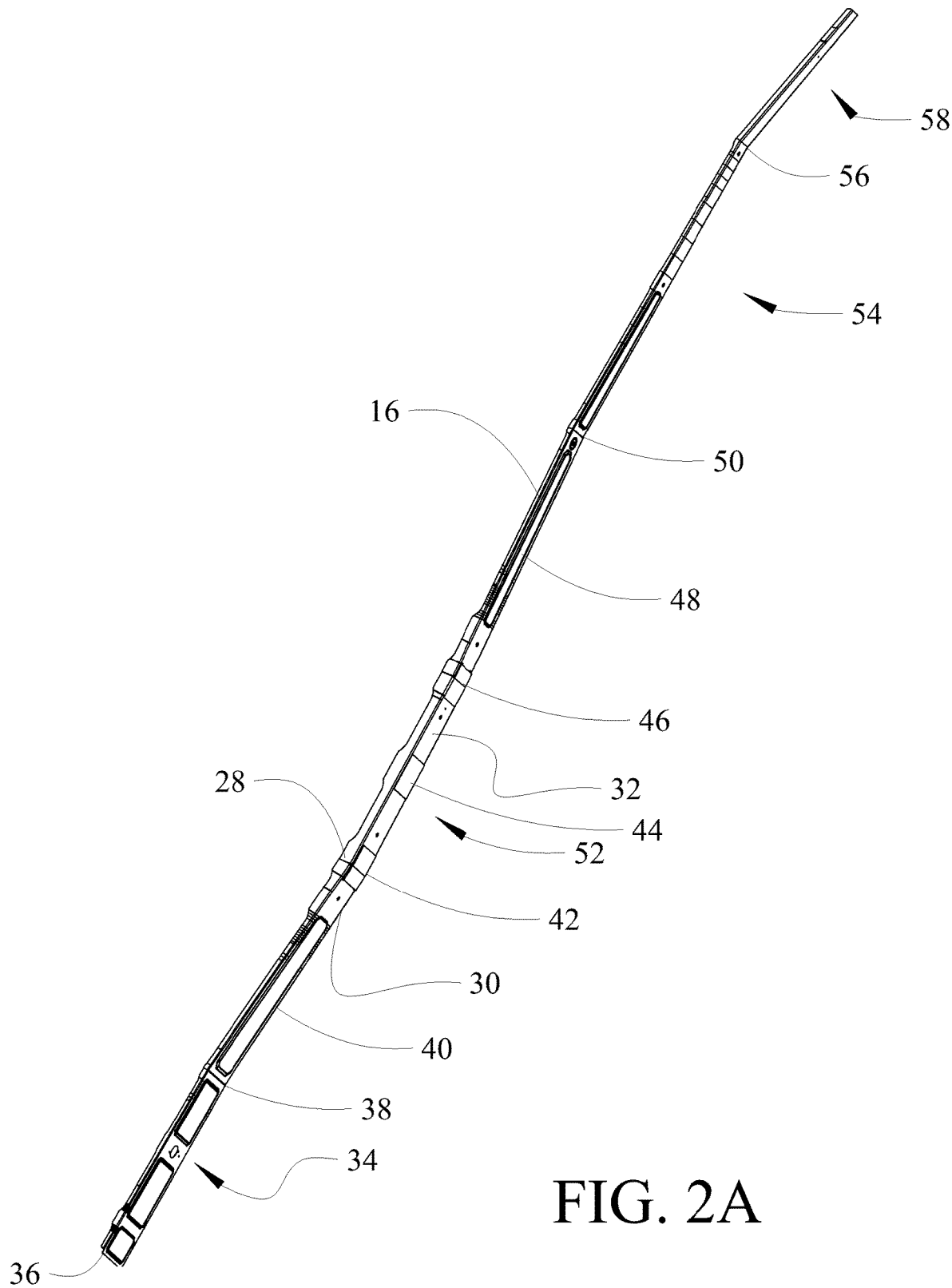
FIG. 2A is a pictorial view of the spar in the embodiment of FIG. 1 with angles exaggerated for clarity.

Details of the spar 16 are shown in FIG. 2A. In the exemplary embodiment, due to the size requirements of actuators for the rudder 10, a standard linear web spar could not be used unless relocated aft from a forward edge 27 of the rudder to accommodate the actuator size, which would introduce longer fittings to accommodate the further spaced hingeline from the spar and the accompanying weight increase to accommodate structural requirements of such a configuration. The present embodiment incorporates a substantially "C" shaped spar having a top flange 28 and bottom flange 30 with a web 32 extending between the flanges. A first region 34 of the spar extends from a lower extent 36 to a first inflection point 38. At the inflection point 38, a first kick is provided in the spar and the web 32 is bent to angle aft extending for a first increment 40 to a second inflection point 42 wherein the web bends again to substantially parallel the hingeline for a second increment 44. At a third inflection point 46 the web bends to angle forward extending for a third increment 48 which terminates at a fourth inflection point 50. The first, second and third increments form a second region 52 of the spar. The aft relief of the second region 52 allows significant additional chordwise length in a connection region for mounting of actuator attachment fittings as will be described in greater detail subsequently. Upward in the drawing, outboard spanwise relative to the end plate, from the fourth inflection point the spar incorporates a third region 54 which again substantially parallels the hingeline. A second kick is provided in the exemplary embodiment commencing further outboard at a fifth inflection point 56 where the web 32 again angles aft for a fourth region 58 terminating at the connection to the cap structure.

Figure 2B:
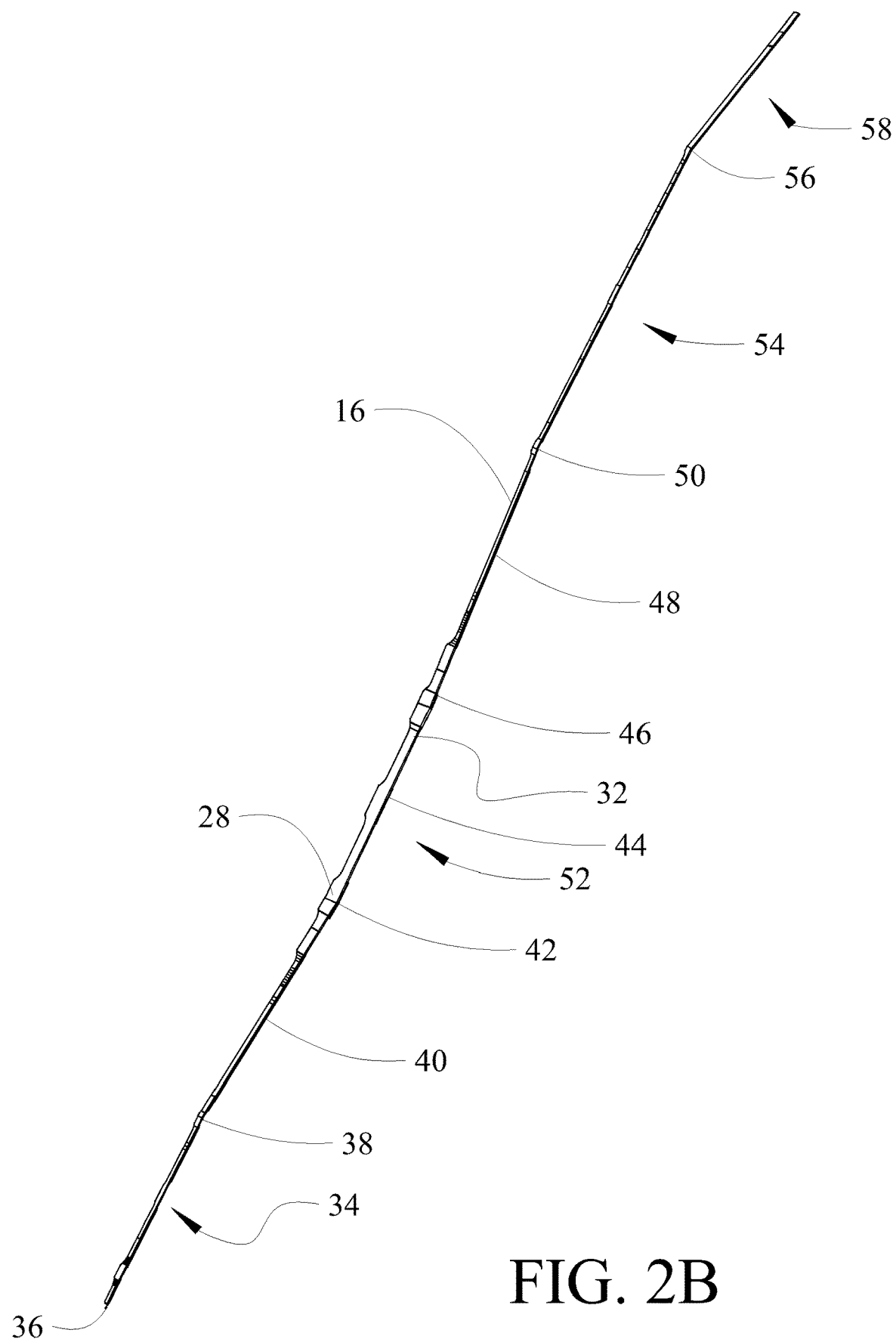
FIG. 2B is a side view of the spar with angles exaggerated for clarity.

The angular relationships of the 5 regions (angles have been exaggerated for clarity) can be seen in the side view of FIG. 2B substantially perpendicular to the flange 28 and parallel to the web 32.

Figure 2C:
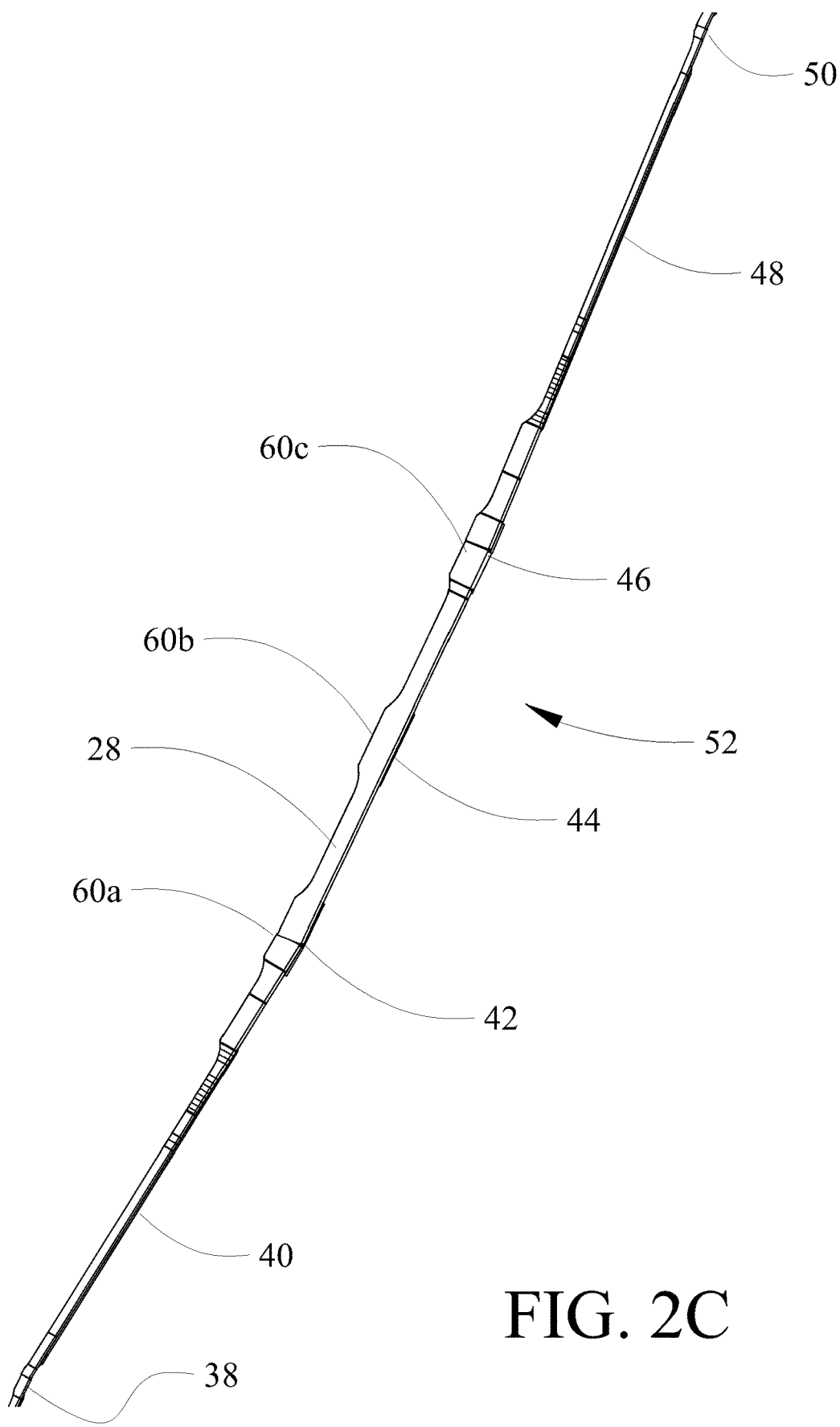
FIG. 2C is a side detailed view of a first region of the spar showing a first "kick" with angles exaggerated for clarity.

The first kick, spar second region 52, is shown in detail in FIG. 2C. As best seen in FIG. 2C, the profile of flange 28 (and flange 30 hidden in the view of FIG. 2C) may be modified to provide additional chordwise length for structural enhancement or to provide coverage for fittings. For the embodiment shown, flange 28 is expanded, to establish an expanded profile, between the second the third inflection points 42, 46 forming second region 52 with the expansion extending partially into the first and third increments 40, 48 proximate the second and third inflection points 42 and 46. Extended expansion areas 60a, 60b and 60c at the locations of the fittings 26d, 26f and 26h accommodate structural requirements for those fittings (shown in FIGS. 1 and 3). The spar can have any number of kicked regions to accommodate actuator, fitting or other hardware sizing designs while maintaining a desired overall chordwise length of the mating control surfaces.

Figure 2D:
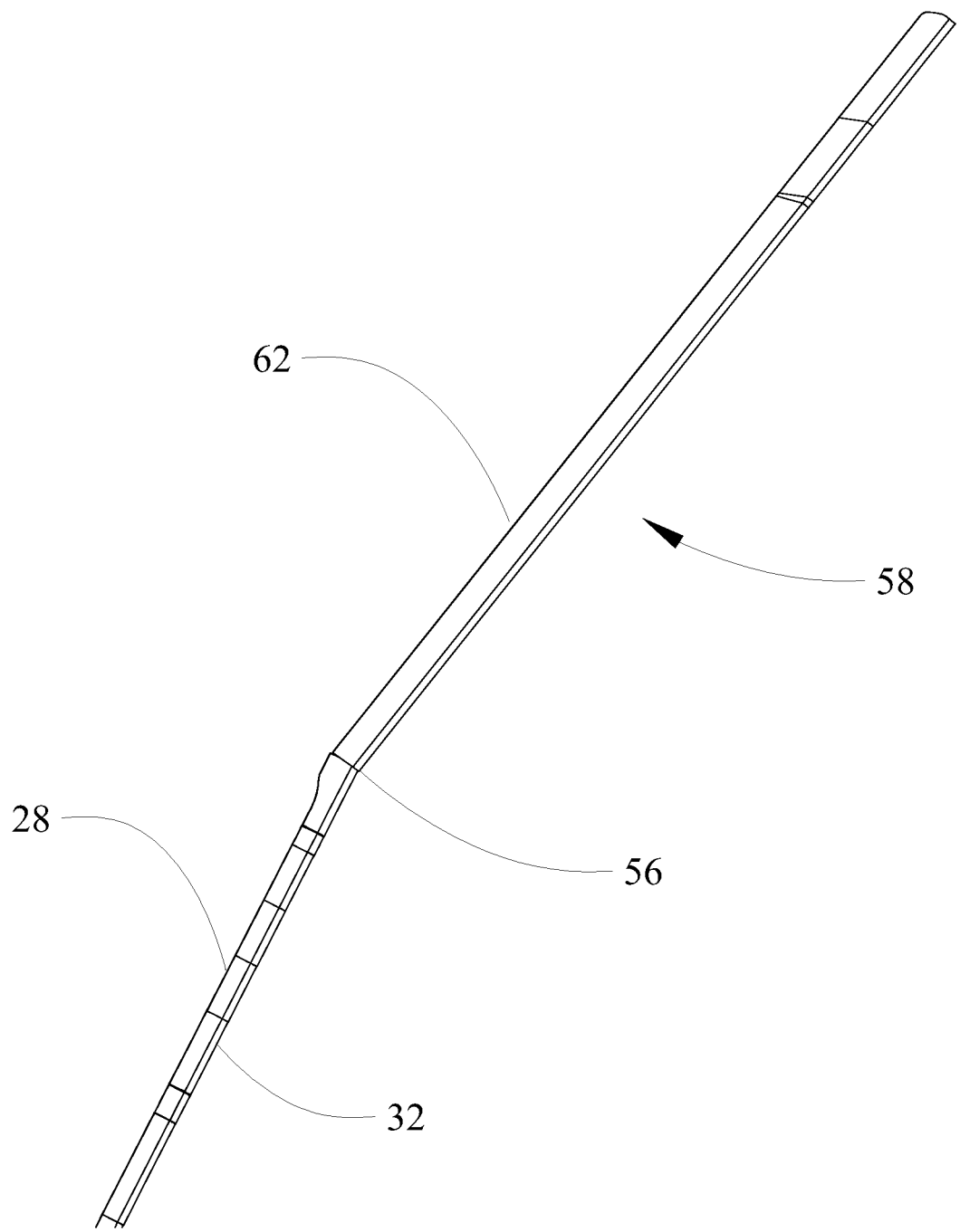
FIG. 2D is a side detailed view of a second region of the spar showing a second kick with angles exaggerated for clarity.

The second kick, the spar fourth region 58, is shown in detail in FIG. 2D. As in the first kick, the flange 28 (and flange 30 hidden in the view of FIG. 2D) is expanded, to establish an expanded profile. However, the expansion covers the entire forth region 58 of the kick with the expansion extending partially into the third region 54 proximate the fourth inflection point 56. Expansion of the flange 28 over the forth region 58 as flange portion 62 provides additional structural capability for the upper end of the rudder 10 to accommodate the fittings 26k and 26l as well as the upper cap structure 19 (seen in FIGS. 1 and 3). Expansion of the flange 28, or flange 30, can occur at any location along the spar to accommodate actuator, fitting or other hardware sizing designs while maintaining a desired overall chordwise length of the mating control surfaces.

Figure 3:
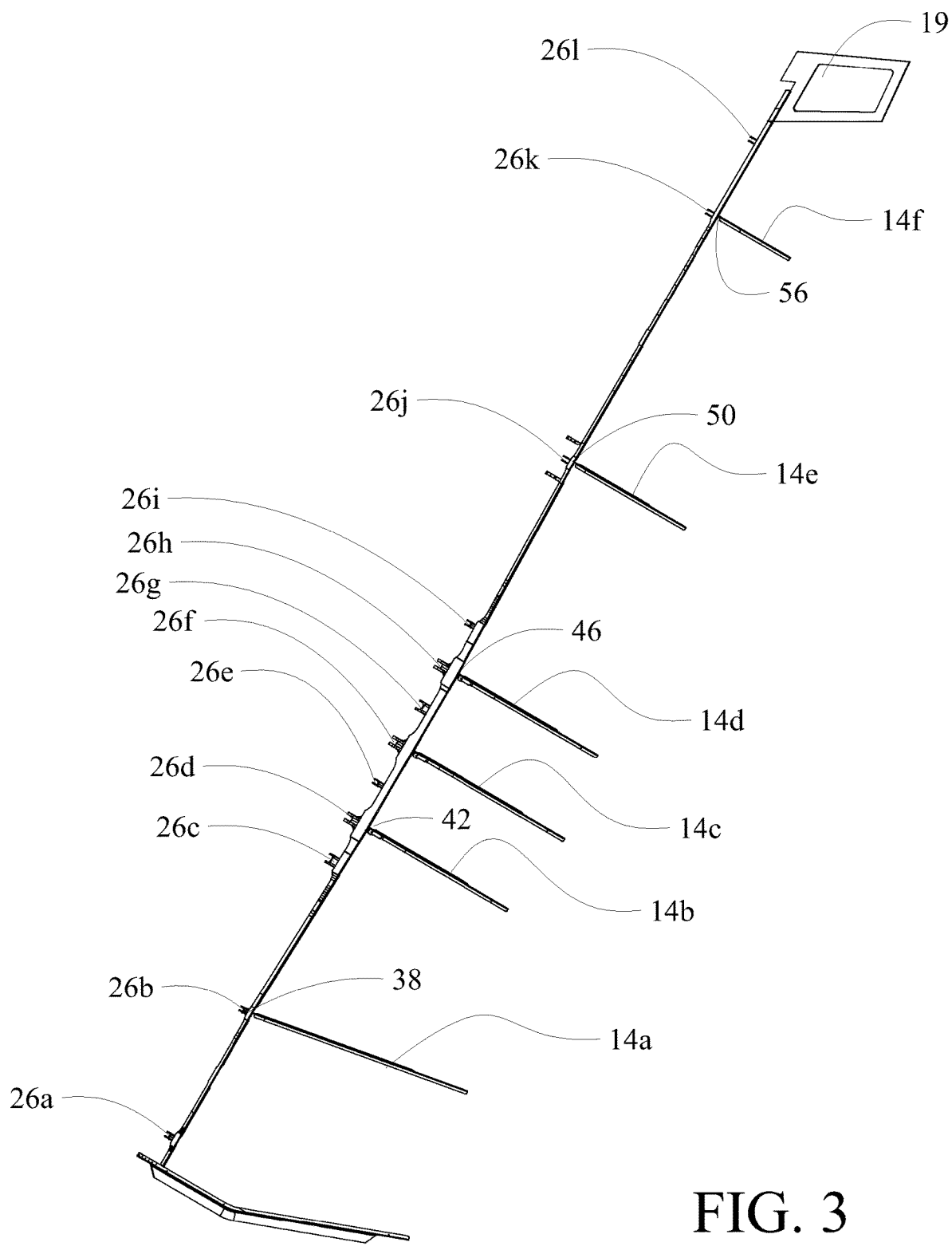
FIG. 3 is a side view of the spar, ribs and fittings of the embodiment of FIG. 1.
Figure 4A:
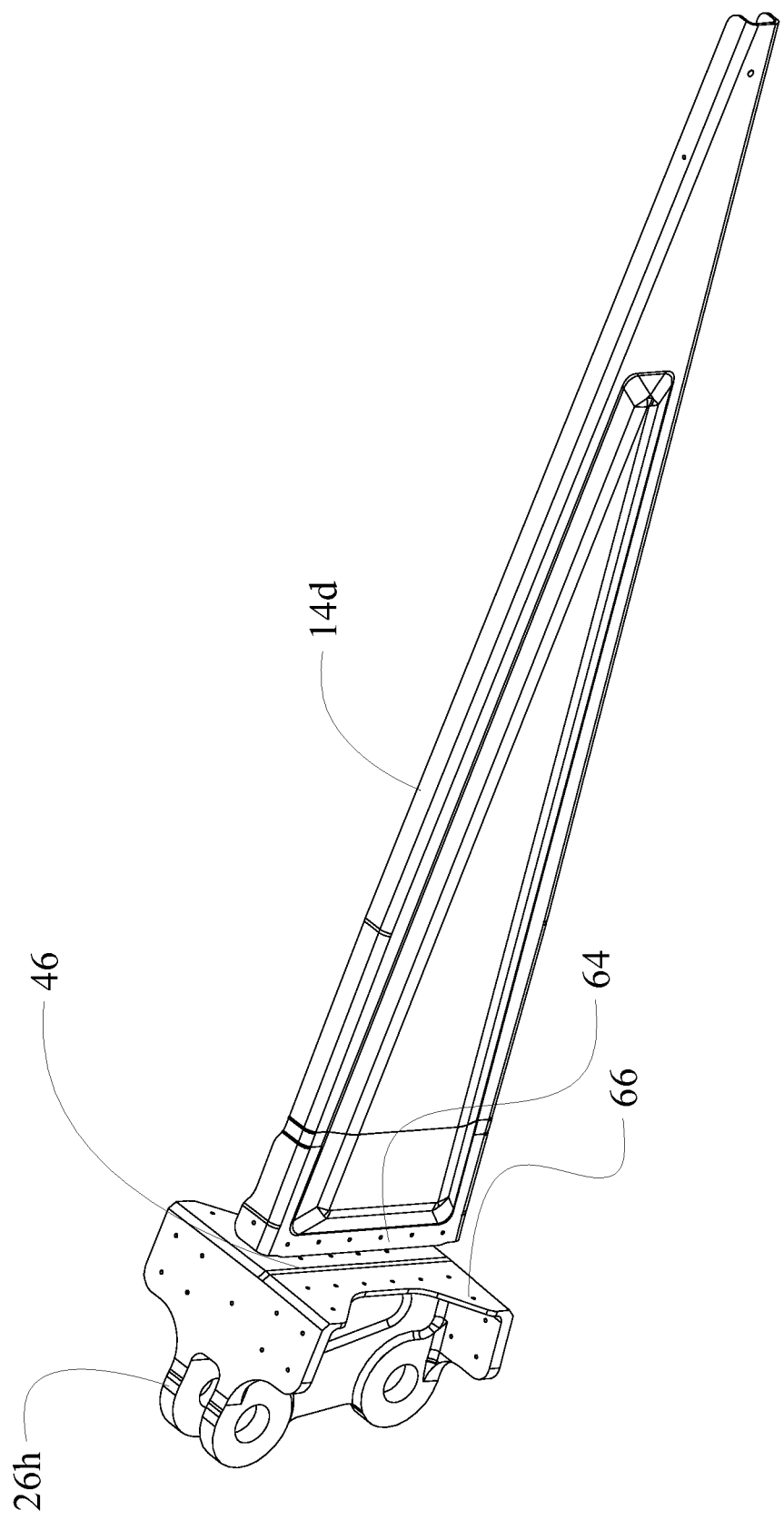
FIG. 4A is a pictorial view of a first example rib and fitting adjacent an intermediate inflection point of the web in the first kick.
Figure 4B:
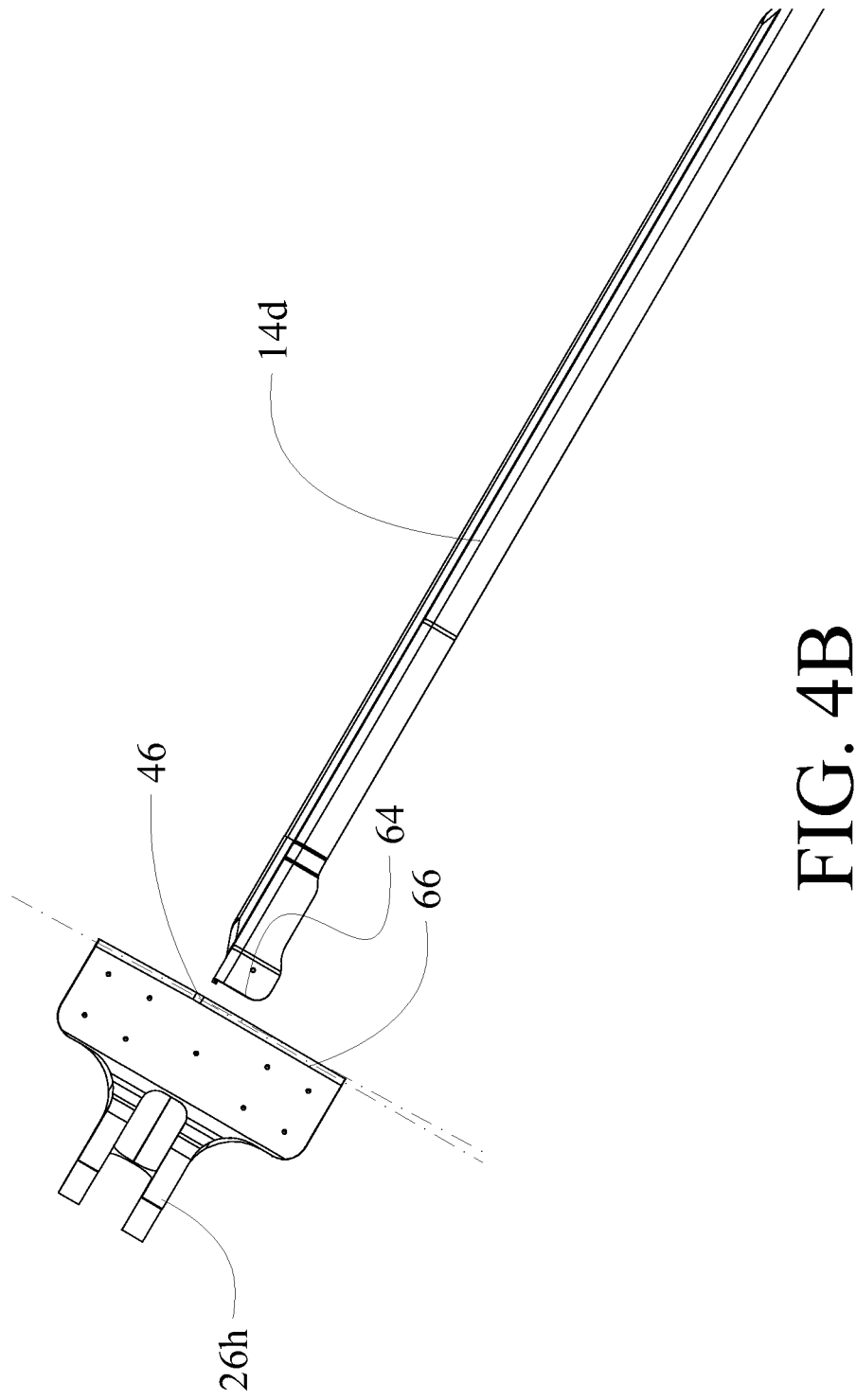
FIG. 4B is a side view of the first example rib and fitting.

FIG. 3 demonstrates the interrelated locations of the spar 16, fittings 26a-26l and ribs 14a-14f in the rudder. Each of the ribs 14a-14f is placed adjacent an inflection point, or break point, in the spar web 32 bounding the regions of the spar providing the kicks. Fittings 26b, 26d, 26f, 26h, 26j and 26k are positioned to directly correspond with an associated one of the ribs. The combined rib and fitting attachment at adjacent the inflection points enhances the structural capability of the kicks in the spar. As seen in FIGS. 4A and 4B, as exemplary of the ribs in the third increment 44, rib 14d provides support for the chord profile while employing a forward cap 64 to support the web 32 of the spar at the fourth inflection point 46. Fitting 26h incorporates an aft surface 66 having a break angle corresponding to the web bend angle at the fourth inflection point 46 thereby supporting the web 32 at the inflection point by supporting the web between the aft surface 66 and forward cap 64 of the rib 14d. As noted previously, the size and function of fitting 26h and its associated interrelated components established the initial need for the kick, providing additional chordwise space for the actuator while maintaining the spar 16 closer to the hingeline coupling the rudder to the vertical tail. A similar configuration is present at rib 14b with fitting 26d at the second inflection point 42 initiating the third increment 44 of the spar forming the aft portion of the kick. Fittings 26d and 26h are longer in the chordwise direction than, for example, fitting 26b, to position the fitting hinge through-hole at the hingeline. Similar structure incorporating the embodiment described may be employed in an elevator.

An interchangeable embodiment provides a fitting 26a-26k coupled to the web 32 without a rib 14a-14f sandwiching the web 32, or alternatively, a rib 14a-14f coupled to the web 32 without a fitting 26a-26k sandwiching the web 32, each of which by themselves structurally supports a bend in the spar 16.

Figure 5A:
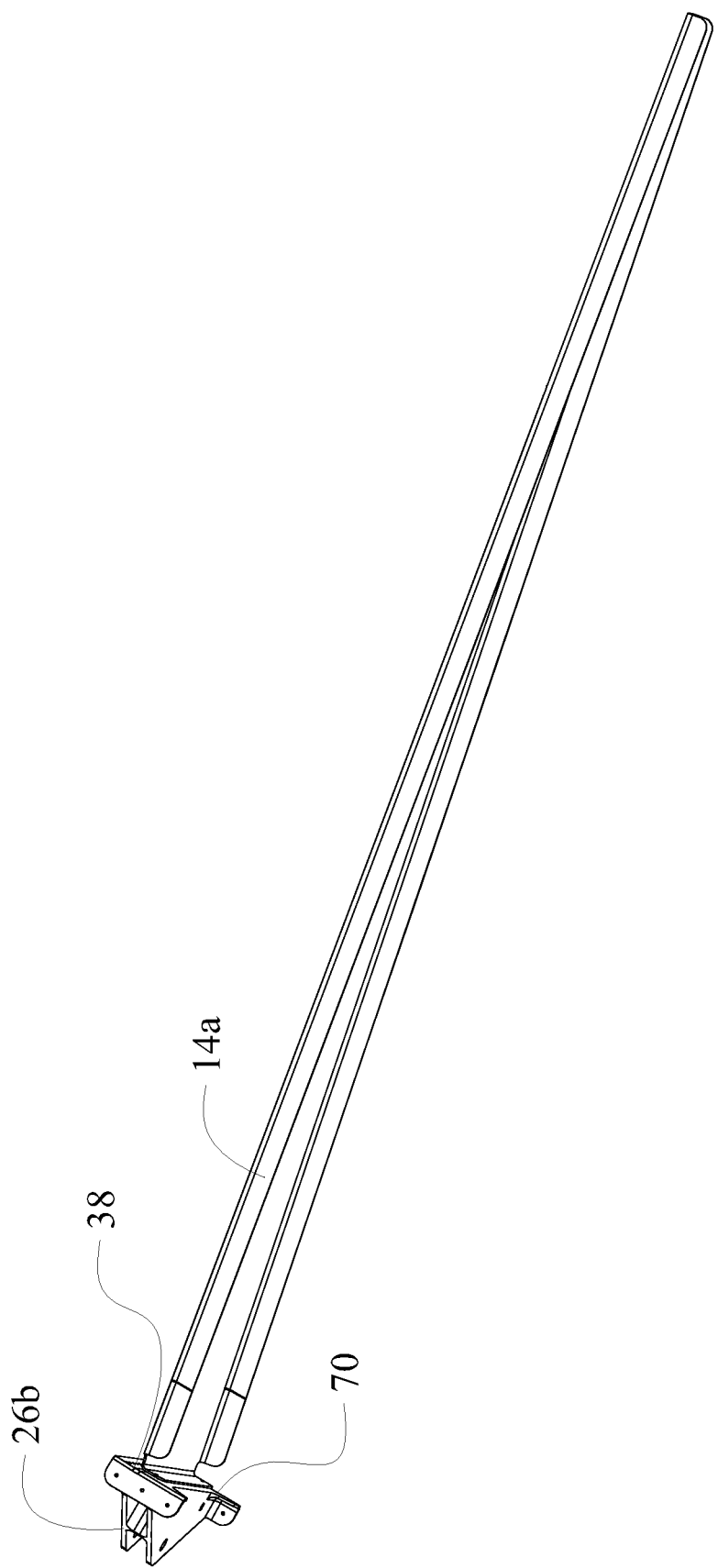
FIG. 5A is a pictorial view of a second example rib and fitting adjacent an lower inflection point of the first kick.
Figure 5B:
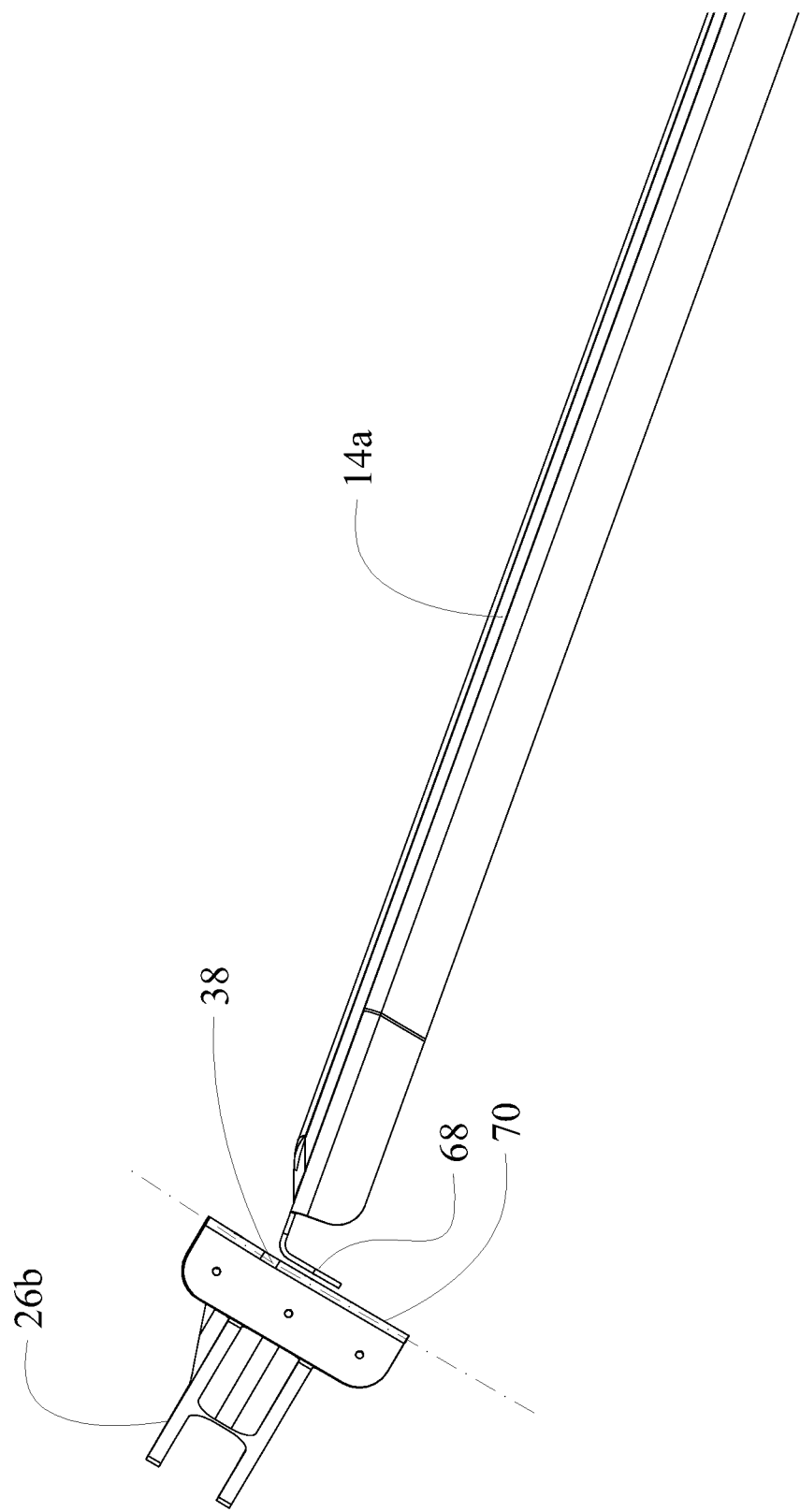
FIG. 5B is a side view of the second example rib and fitting.

Similarly as shown in FIGS. 5A and 5B, rib 14a and fitting 26b engage the web 32 at the first inflection point 38. Rib 14a incorporates a forward angle plate 68 which engages the web 32 adjacent the inflection point and fitting 26b includes an aft surface 70 having a break angle corresponding to the web bend angle at the first inflection point 38 thereby supporting the web 32 at the inflection point by sandwiching the web between the aft surface 70 and forward angle plate 68 of the rib 14a. This configuration enhances the structure at the initiation of the kick at inflection point 38. A similar configuration is present at rib 14e with fitting 26j for the final inflection point of the first kick.

Figure 6:
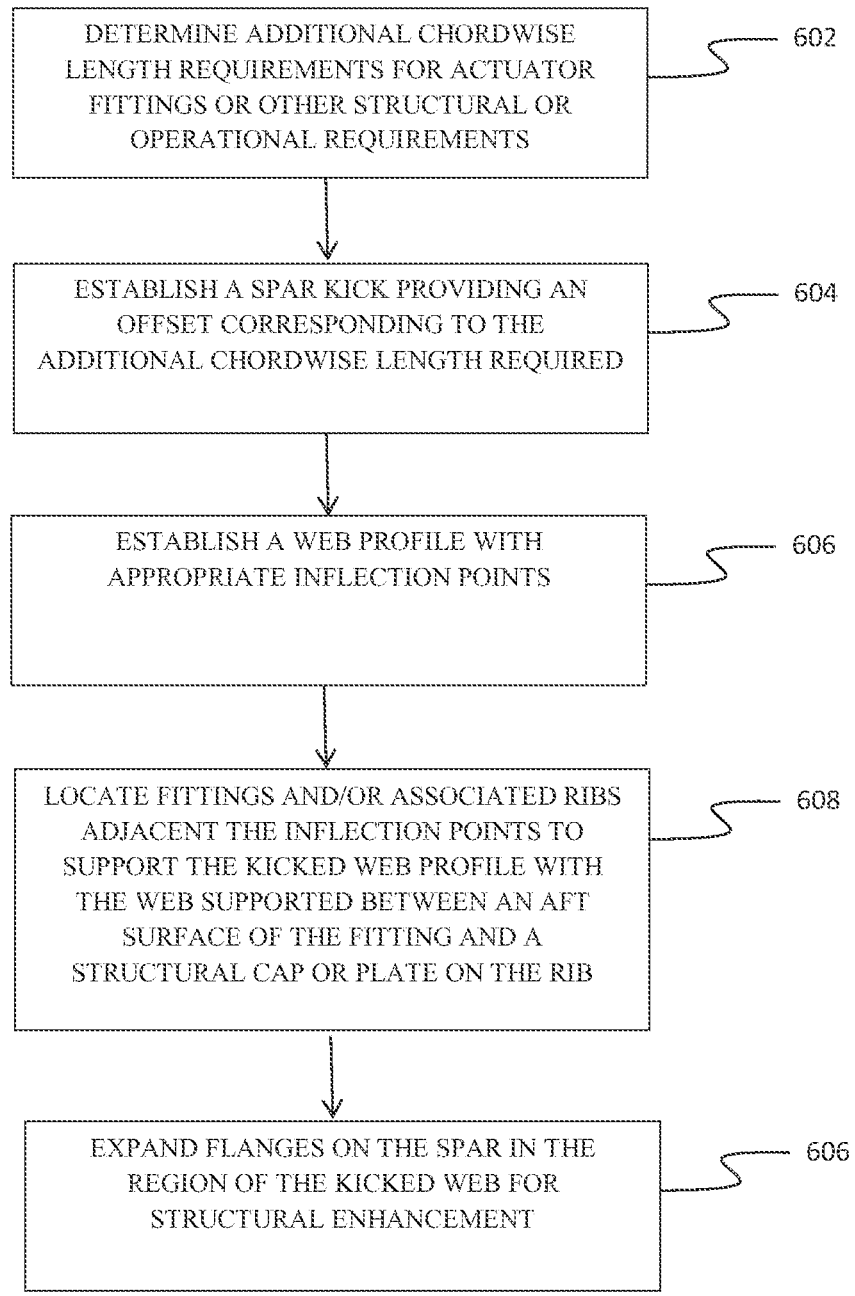
FIG. 6 is a flow chart of a method for implementation of the embodiment described herein.

The embodiment disclosed for a kicked spar allows integration of fittings or other structural requirements that would otherwise require relocating of the spar or other structural modification. A method for implementation of a kicked spar is shown in FIG. 6 wherein a determination is made of additional chordwise length requirements for actuator fittings or other structural or operational requirements, step 602. A spar kick providing an offset corresponding to the additional chordwise length required is established, step 604 and a web profile with appropriate inflection points is established, step 606. Fittings and/or ribs are located adjacent the inflection points to support the kicked web profile, step 608, with the web supported between an aft surface of the fitting and a structural cap or plate on the rib. Flanges on the spar are expanded in the region of the kicked web, step 610, to establish an expanded profile for structural enhancement.

Figure 7:
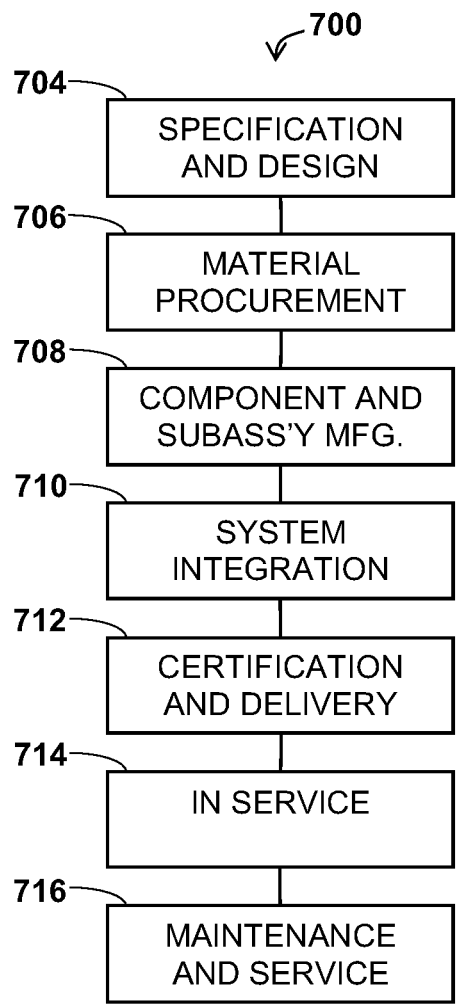
FIG. 7 is a flow diagram of aircraft production and service methodology in which the present embodiments may be employed; and, FIG. 8 is a block diagram of an aircraft employing the embodiments.
Figure 8:
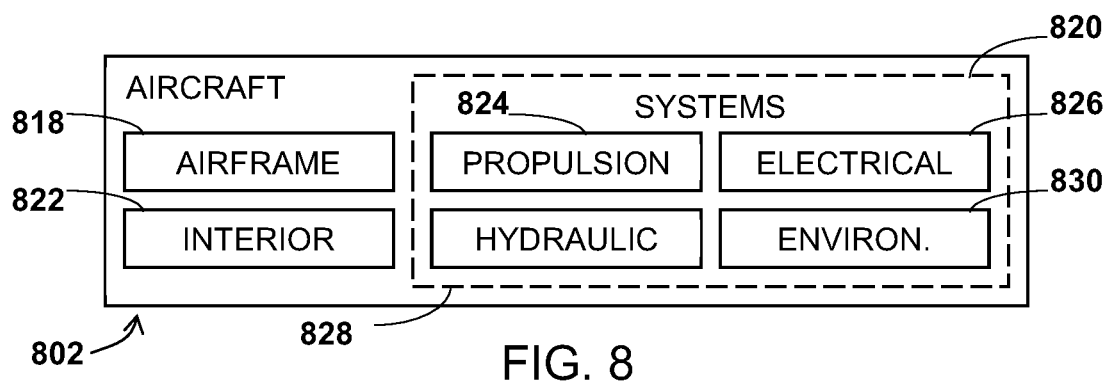

Examples of the disclosure may be described in the context of an aircraft manufacturing and service method 700 as shown in FIG. 7 and an aircraft 802 as shown in FIG. 8. During pre-production, exemplary method 700 may include specification and design 704 of the aircraft 702 and material procurement 706. During production, component and subassembly manufacturing 708 and system integration 710 of the aircraft 802 takes place. Thereafter, the aircraft 802 may go through certification and delivery 712 in order to be placed in service 714. While in service by a customer, the aircraft 802 is scheduled for routine maintenance and service 716 (which may also include modification, reconfiguration, refurbishment, and so on).

Each of the processes of method 700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 8, the aircraft 802 produced by exemplary method 700 may include an airframe 818 with a plurality of systems 820 and an interior 822. Examples of high-level systems 820 include one or more of a propulsion system 824, an electrical system 826, a hydraulic system 826, and an environmental system 830. Any number of other systems may be included.

Apparatus and methods embodied herein may be employed during any one or more of the stages of the production and service method 700. For example, components or subassemblies corresponding to production process 708 may be fabricated or manufactured in a manner similar to components or subassemblies produced while the aircraft 802 is in service. Also, one or more aspects of the apparatus, method, or a combination thereof may be utilized during the production stages 708 and 710, for example, by substantially expediting assembly of or reducing the cost of an aircraft 802. Similarly, one or more of apparatus embodiments, method embodiments, or a combination thereof may be utilized while the aircraft 802 is in service, for example and without limitation, to maintenance and service 716.

The examples described herein provide structure for aircraft control surfaces such as rudders and elevators. An aircraft 802 employing the embodiments provides enhanced operation by allowing the additional chordwise space for actuators or other requirements while maintaining the spar 16 closer to the hingeline coupling the control surface, the rudder or elevator in the described embodiments, to the associated vertical or horizontal stabilizer. In operation of the aircraft a hinge line actuator is actuated for movement of a control surface wherein the control surface incorporates a spar having a web with at least one kick bending at inflection points to provide a region having additional chordwise offset from a forward edge of the control surface to accomodate the hinge line actuator as defined for the presently described embodiments. The movement of the control surface is employed for aerodynamic control by inducing yaw or pitch for the described embodiments of a rudder or elevator.

Having now described various embodiments in detail as required by the patent statutes, those skilled in the art will recognize modifications and substitutions to the specific embodiments disclosed herein. Such modifications are within the scope and intent of the present disclosure as defined in the following claims.

What is claimed is:

1. A method for implementation of a kicked spar, the method comprising:
   determining a desired chordwise length to accommodate an actuator component along a forward edge of a control surface; and
   forming a bend in a spar of the control surface, the bend providing an offset corresponding to the desired chordwise length, the spar having a web profile with inflection points.

2. The method of claim 1, further including locating a fitting and a rib adjacent one of the inflection points to support the web profile.

3. The method of claim 2, wherein locating the fitting and the rib includes supporting a web of the spar between an aft surface of the fitting and a structural cap or plate on the rib.

4. The method of claim 2, further including expanding flanges on the spar in a region of the bend for structural enhancement.

5. The method of claim 1, further including coupling a fitting to a first side of a web of the spar.

6. The method of claim 5, further including coupling a rib to a second side of the web opposite the first side.

7. The method of claim 6, wherein the fitting and the rib are coupled to the web near one of the inflections points.

8. The method of claim 5, wherein the fitting is at least one of an actuator fitting or a hinge fitting.

9. The method of claim 1, wherein the spar extends along at least a portion of the forward edge of the control surface.

10. The method of claim 1, wherein the inflection points include a first inflection point bending the web profile aft from a first region of the spar, a second inflection point bending the web profile substantially parallel to the forward edge of the control surface, and a third inflection point bending the web profile forward to a fourth inflection point.

11. The method of claim 1, wherein the spar has a substantially C-shaped cross-section.

12. The method of claim 1, wherein the control surface is a rudder or an elevator.

13. The method of claim 1, wherein the bend provides increased space between the bend and a hinge line of the control surface.

14. A method for implementation of a kicked spar, the method comprising:
   determining a chordwise length to accommodate a component along a forward edge of a control surface;
   forming a plurality of bends in a spar to define a region that is offset from a hingeline of the control surface by the chordwise length; and
   extending the spar along at least a portion of the forward edge of the control surface.

15. The method of claim 14, wherein the region is formed by a first bend directing the spar aft, a second bend directing the spar substantially parallel to the forward edge of the control surface, and a third bend directing the spar forward.

16. The method of claim 14, wherein the region is a first region, the spar including a second region, the first region being bent aft from the second region to provide an offset.

17. The method of claim 14, wherein the spar includes an upper flange, a lower flange, and a web extending between the upper and lower flanges.

18. The method of claim 17, further including expanding the upper and lower flanges of the spar along the region of the spar.

19. The method of claim 14, wherein the spar has a substantially C-shaped cross-section.

20. The method of claim 14, wherein the control surface is a rudder or an elevator.

* * * * *